(12) United States Patent
Chen

(10) Patent No.: US 10,097,110 B2
(45) Date of Patent: Oct. 9, 2018

(54) MODULATION METHOD FOR A THREE-PHASE MULTILEVEL CONVERTER

(71) Applicant: Delta Electronics (Shanghai) Co., Ltd., Shanghai (CN)

(72) Inventor: Kai Chen, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 15/908,825

(22) Filed: Mar. 1, 2018

(65) Prior Publication Data
US 2018/0262125 A1    Sep. 13, 2018

(30) Foreign Application Priority Data

Mar. 8, 2017 (CN) .......................... 2017 1 0135651

(51) Int. Cl.
*H02M 7/5387* (2007.01)
*H02P 29/032* (2016.01)
*H02P 27/08* (2006.01)

(52) U.S. Cl.
CPC ........ *H02M 7/53871* (2013.01); *H02P 27/08* (2013.01); *H02P 29/032* (2016.02); *H02P 2209/11* (2013.01)

(58) Field of Classification Search
CPC ........ H02M 1/12; H02M 7/5395; H02M 1/14; H02M 1/4266; H02M 2001/123
See application file for complete search history.

(56) References Cited

U.S. PATENT DOCUMENTS

2016/0211792 A1* 7/2016 Yamakawa ............ H02M 1/15

FOREIGN PATENT DOCUMENTS

| CN | 101282093 A | 10/2008 |
| CN | 102195550 A | 9/2011 |
| CN | 106208735 A | 12/2016 |
| TW | 296882 U | 1/1997 |

* cited by examiner

*Primary Examiner* — Adolf Berhane
*Assistant Examiner* — Afework Demisse
(74) *Attorney, Agent, or Firm* — CKC & Partners Co., Ltd.

(57) ABSTRACT

The present invention discloses a modulation method for a three-phase multilevel converter. The modulation method comprises the following steps: generating first three-phase sinusoidal modulated wave signals by a control loop in the three-phase multilevel converter; generating second three-phase modulated wave signals by processing the first three-phase sinusoidal modulated wave signals, wherein in proximity to peak values of a line voltage of the second three-phase modulated wave signals, absolute values of any two phases are unequal; generating PWM pulse signals based on the second three-phase modulated wave signals; and generating driving signals for respective power units in the three-phase multilevel converter based on the PWM pulse signals.

14 Claims, 8 Drawing Sheets

MODULATION METHOD FOR A THREE-PHASE MULTILEVEL CONVERTER

CROSS-REFERENCE TO RELATED APPLICATIONS

This non-provisional application claims priority under 35 U.S.C. § 119(a) on Patent Application No. 201710135651.5 filed in P.R. China on Mar. 8, 2017, the entire contents of which are hereby incorporated by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

FIELD OF THE PRESENT INVENTION

The present invention relates to a modulation method for a three-phase multilevel converter, and particular to a modulation method capable of inhibiting a two-level voltage jumping generated in a line voltage outputted from a system.

DISCUSSION OF THE RELATED ART

When a conventional three-phase multilevel converter uses a unipolar doubled-frequency carrier phase-shifted modulation and saddle-shaped modulated waves, IGBTs at two phases of the same stage may operate simultaneously in the regions proximity to peak values of a line voltage outputted from the converter, which will result in a two-level voltage jumping in the line voltage. When the converter is connected with a motor via long cables, voltage reflection may occur at the motor end due to the influence of distribution parameters in the cables. So the two-level voltage jumping can induce an overvoltage up to twice at the motor end. The more the number of levels jumping in the output voltage of the converter is, the higher the overvoltage generated at the motor end is. And the overvoltage generated at the motor end accelerates the insulation ageing of the motor and shortens the service life of the motor.

FIG. 11 is a view showing a topological structure of a three-phase H-bridge multilevel converter in the prior art; FIG. 12A is a view showing a topological structure of a power unit of A-phase in FIG. 11; FIG. 12B is a view showing a topological structure of a power unit of B-phase in FIG. 11; and FIG. 12C is a view showing a topological structure of a power unit of C-phase in FIG. 11.

Please referring to FIGS. 1 to 3, the multilevel converter shown in FIG. 11 uses a conventional unipolar doubled-frequency carrier phase-shifted modulation and saddle-shaped modulated waves. FIG. 1 is a schematic diagram showing three-phase sinusoidal modulated waves $u_a$, $u_b$, $u_c$, and conventional saddle-shaped modulated waves $u'_a$, $u'_b$, $u'_c$ injected with a triple harmonic. Three-phase sinusoidal modulated waves $u_a$, $u_b$, $u_c$ are injected with a triple harmonic to get conventional saddle-shaped modulated waves $u'_a$, $u'_b$, $u'_c$. FIG. 2 is a schematic diagram showing the converter using a unipolar frequency-doubled modulation. FIG. 3 is a schematic diagram showing line voltages of A-phase and B-phase and its local enlarged view. As shown in FIGS. 1 to 3, by taking the sector VI for example, the triple harmonic to be injected into the modulated waves is as follows:

$$u_z = -\frac{1}{2}(u_{max}+u_{min}) = -\frac{1}{2}(u_a+u_b)$$

Then, the modulated waves injected with the triple harmonic are as follows:

$$u'_a = u_a + u_z = \frac{1}{2}u_a - \frac{1}{2}u_b$$

$$u'_b = u_b + u_z = \frac{1}{2}u_a + \frac{1}{2}u_b$$

$$u'_c = u_c + u_z = \frac{3}{2}u_c$$

As can be seen, $u'_a \equiv -u'_b$ in this sector. That is, $u'_a$ is identically equal to $-u'_b$. Further, referring to FIG. 2, when a unipolar frequency-doubled modulation is used, switches (e.g., IGBTs) of A-phase and B-phase at the same stage may operate simultaneously, resulting in two-level voltage jumping in the line voltage $u_{AB}$.

Therefore, it is needed to develop a modulation method for a three-phase multilevel converter to overcome the above defects.

SUMMARY OF THE PRESENT INVENTION

In order to overcome the above problems exiting in the prior art, one aspect of the present invention is to provide a modulation method for a three-phase multilevel converter, which may comprise the following steps:

step 1: generating first three-phase sinusoidal modulated wave signals by a control loop in the three-phase multilevel converter;

step 2: generating second three-phase modulated wave signals by processing the first three-phase sinusoidal modulated wave signals, wherein in proximity to peak values of a line voltage of the second three-phase modulated wave signals, absolute values of any two phases are unequal;

step 3: generating PWM pulse signals based on the second three-phase modulated wave signals; and step 4: generating driving signals for respective power units in the three-phase multilevel converter based on the PWM pulse signals.

In order to overcome the above problems exiting in the prior art, another aspect of the present invention is to provide a three-phase multilevel converter, which may comprise:

a control loop for generating first three-phase sinusoidal modulated wave signals;

a plurality of power units;

a modulator which is electrically coupled with the control loop and the power units, wherein the modulator processes first three-phase sinusoidal modulated wave signals to generate second three-phase modulated wave signals, generates PWM pulse signals based on the second three-phase modulated wave signals, and transmits the PWM pulse signals to the plurality of power units, and the power plurality of units generate driving signals based on the PWM pulse signals, wherein in proximity to peak values of a line voltage of the second three-phase modulated wave signals, absolute values of any two phases are unequal.

Compared with the prior art, the present invention has all or some of the following beneficial technical effects. The technical solution disclosed by the present invention aims to inhibit a two-level jump in a line voltage outputted from bridge arms of three-phase multilevel inverters. The overvoltage decreases at the motor end, thus the motor is protected from the insulation, and the service life of the motor is extended.

DETAILED DESCRIPTION OF THE PRESENT INVENTION

The present invention is described in detail in combination with drawings and embodiments. The embodiments are implemented according to the technical solution of the present invention. The embodiments and operation processes are given, but the protection scope of the present invention is not limited to the following embodiments.

Figure 4A:
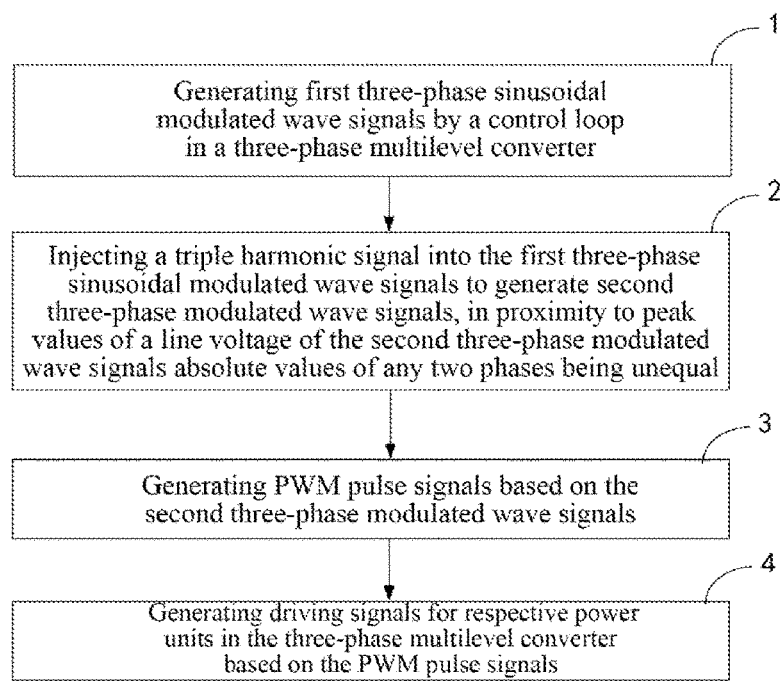
FIG. 4A is a flowchart showing the steps of the modulation method for a three-phase multilevel converter according to the present invention.

Referring to FIG. 4A, FIG. 4A is a flowchart showing the steps of the modulation method for a three-phase multilevel converter according to the present invention. As shown in FIG. 4A, the modulation method comprises:

step 1: generating first three-phase sinusoidal modulated wave signals by a control loop in the three-phase multilevel converter;

step 2: generating second three-phase modulated wave signals by processing the first three-phase sinusoidal modulated wave signals, wherein in proximity to peak values of a line voltage of the second three-phase modulated wave signals, absolute values of any two phases are unequal;

step 3: generating PWM pulse signals based on the second three-phase modulated wave signals; and step 4: generating driving signals for respective power units in the three-phase multilevel converter based on the PWM pulse signals.

Here, the step 2 further comprises: injecting triple harmonic signals into the first three-phase sinusoidal modulated wave signals to generate the second three-phase modulated wave signals.

Figure 5:
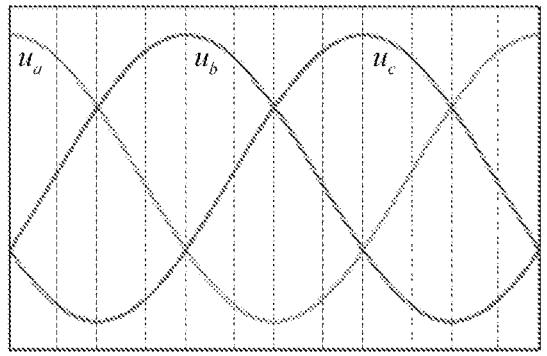
FIG. 5 is a schematic diagram showing the first three-phase sinusoidal modulated wave signals and the second three-phase modulated wave signals according to a first embodiment of the present invention.
Figure 5:
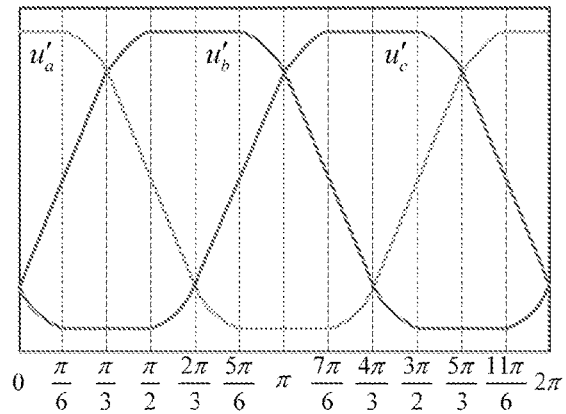

FIG. 5 is a schematic diagram showing the first three-phase sinusoidal modulated wave signals and the second three-phase modulated wave signals according to the first embodiment of the present invention. Referring to FIG. 5, $u_a$, $u_b$, and $u_c$ indicate the first three-phase sinusoidal modulated wave signals. One cycle of the modulated wave signals is divided into a plurality of modulated intervals. For example, in FIG. 5, a work cycle is divided into 12 modulated intervals, but the present invention is not limited to this. Different triple harmonic signals may be injected into respective modulated intervals to obtain the second three-phase modulated wave signals $u'_a$, $u'_b$, and $u'_c$. Here, the triple harmonic signals injected are sectional triple harmonic signals. The expressions of the sectional triple harmonic signals may be as follows:

$$\text{when } 0 \le \theta < \frac{\pi}{6}, u_z = \frac{\sqrt{3}}{2} U_m - u_a;$$

$$\text{when } \frac{\pi}{6} \le \theta < \frac{\pi}{2}, u_z = -\frac{\sqrt{3}}{2} U_m - u_c;$$

$$\text{when } \frac{\pi}{2} \le \theta < \frac{5\pi}{6}, u_z = \frac{\sqrt{3}}{2} U_m - u_b;$$

$$\text{when } \frac{5\pi}{6} \le \theta < \frac{7\pi}{6}, u_z = -\frac{\sqrt{3}}{2} U_m - u_a;$$

$$\text{when } \frac{7\pi}{6} \le \theta < \frac{3\pi}{2}, u_z = \frac{\sqrt{3}}{2} U_m - u_c;$$

$$\text{when } \frac{3\pi}{2} \le \theta < \frac{11\pi}{6}, u_z = -\frac{\sqrt{3}}{2} U_m - u_b; \text{ and}$$

$$\text{when } \frac{11\pi}{6} \le \theta < 2\pi, u_z = \frac{\sqrt{3}}{2} U_m - u_a.$$

Here, the amplitude of triangular carriers may change within a range of $-U_m$ to $U_m$. $u_z$ indicates the triple harmonic signal injected in the embodiment. $u_a$, $u_b$, and $u_c$ are respectively the first three-phase sinusoidal modulated wave signals of A-phase, B-phase, and C-phase in the three-phase multilevel converter. $\theta$ is the phase angle of the first three-phase sinusoidal modulated wave signal $u_a$.

Figure 6:
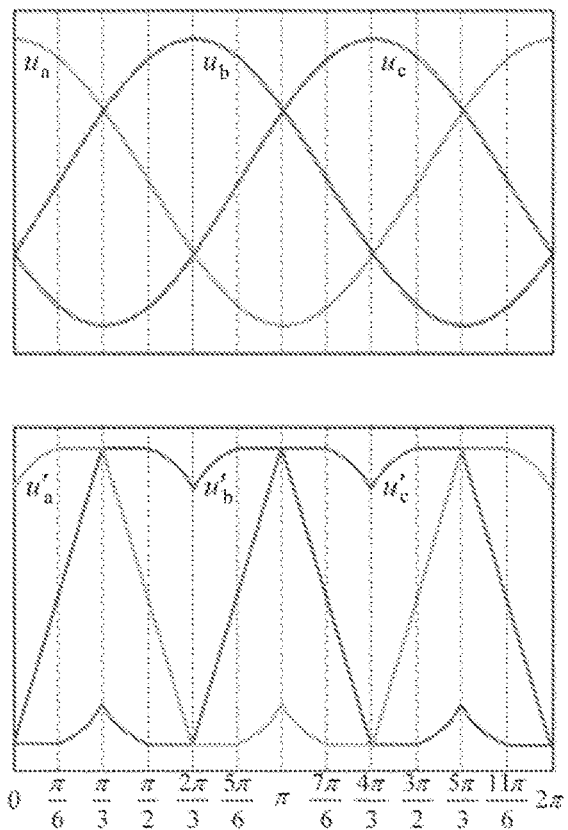
FIG. 6 is a schematic diagram showing the first three-phase sinusoidal modulated wave signals and the second three-phase modulated wave signals according to a second embodiment of the present invention.

FIG. 6 is a schematic diagram showing the first three-phase sinusoidal modulated wave signals and the second three-phase modulated wave signals according to a second embodiment of the present invention. Similar to the first embodiment, one cycle is divided into a plurality of modulated wave intervals. For example, in FIG. 6, a work cycle is divided into 12 modulated intervals, but the present invention is not limited to this. Wherein different triple harmonic signals may be injected into respective modulated wave intervals to obtain the second three-phase modulated wave signals u'$_a$, u'$_b$, and u'$_c$ according to the present embodiment. Here, the triple harmonic signals injected are sectional triple harmonic signals. The expressions of the sectional triple harmonic signals may be as follows:

when $0 \leq \theta < \frac{\pi}{6}$, $u_z = -\frac{\sqrt{3}}{2}U_m - u_c$;

when $\frac{\pi}{6} \leq \theta < \frac{\pi}{3}$, $u_z = \frac{\sqrt{3}}{2}U_m - u_a$;

when $\frac{\pi}{3} \leq \theta < \frac{\pi}{2}$, $u_z = \frac{\sqrt{3}}{2}U_m - u_b$;

when $\frac{\pi}{2} \leq \theta < \frac{2\pi}{3}$, $u_z = -\frac{\sqrt{3}}{2}U_m - u_c$;

when $\frac{2\pi}{3} \leq \theta < \frac{5\pi}{6}$, $u_z = -\frac{\sqrt{3}}{2}U_m - u_a$;

when $\frac{5\pi}{6} \leq \theta < \pi$, $u_z = \frac{\sqrt{3}}{2}U_m - u_b$;

when $\pi \leq \theta < \frac{7\pi}{6}$, $u_z = \frac{\sqrt{3}}{2}U_m - u_c$;

when $\frac{7\pi}{6} \leq \theta < \frac{4\pi}{3}$, $u_z = -\frac{\sqrt{3}}{2}U_m - u_a$;

when $\frac{4\pi}{3} \leq \theta < \frac{3\pi}{2}$, $u_z = -\frac{\sqrt{3}}{2}U_m - u_b$;

when $\frac{3\pi}{2} \leq \theta < \frac{5\pi}{3}$, $u_z = \frac{\sqrt{3}}{2}U_m - u_c$;

when $\frac{5\pi}{3} \leq \theta < \frac{11\pi}{6}$, $u_z = \frac{\sqrt{3}}{2}U_m - u_a$; and when $\frac{11\pi}{6} \leq \theta < 2\pi$, $u_z = -\frac{\sqrt{3}}{2}U_m - u_b$;

Here, the amplitude of triangular carriers may change within a range of —$U_m$ to $U_m$. $u_z$ indicates the triple harmonic signal injected. $u_a$, $u_b$, and $u_c$ are respectively the first three-phase sinusoidal modulated wave signals of A-phase, B-phase, and C-phase in the three-phase multilevel converter. $\theta$ is the phase angle of the first three-phase sinusoidal modulated wave signal $u_a$.

It should be noted that the present invention is not limited to the above triple harmonic signals. In other embodiments, the designer can adjust the triple harmonic signals injected according to design requirements. After the triple harmonic signals are injected, the absolute values of any two phases are unequal in proximity to the peak values of the line voltages of the generated second three-phase modulated wave signals.

The above obtained triple harmonic signals $u_z$ are injected into the first three-phase sinusoidal modulated wave signals $u_a$, $u_b$, and $u_c$ according to the divided modulated wave intervals, to obtain the second three-phase modulated wave signals which are expressed as follows:

u'$_a$=u$_a$+u$_z$, u'$_b$=u$_b$+u$_z$, u'$_c$=u$_c$+u$_z$.

Under a condition that the maximum voltage utilization is maintained, in proximity to the peak values of the line voltage of the second three-phase modulated wave signals according to the above expressions, the absolute values of any two phases are unequal. So a two-level jumping is prevented from occurring in the line voltage outputted from a bridge arm in the three-phase multilevel cascaded converter. Thereby, the overvoltage is reduced at the motor end, the motor is protected from the insulation and the service life of the motor is prolonged. In the above embodiment, "in proximity to peak values" indicates the intervals in which the absolute values of the amplitudes of the second three-phase modulated wave signals reach their maximum values. When taking u'$_b$ in FIG. 5 for example, the intervals "in proximity to peak values" are (π/2, 5π/6) and (3π/2, 11π/6); and when taking u'$_b$ in FIG. 6 for example, the internals "in proximity to peak values" are (π/3, π/2), (5π/6, 2π), (4π/3, 3π/2), and (11π/6, 2π).

The phase-shifting control is performed on the second three-phase modulated wave signals to generate PWM pulse signals. Here, the phase-shifting control comprises a carrier phase-shifted modulation, and a phase-shifting control for the PWM pulse signals at certain points.

The carrier phase-shifted modulation may refer to the unipolar frequency-doubled carrier phase-shifted modulation. Specifically, the above obtained second three-phase modulated wave signals u'$_a$, u'$_b$, and u'$_c$ may respectively compare with carrier signals to generate PWM pulse signals for the bridge arm switches of respective phases Ta11, Tb11 and Tc11. The phases of the PWM pulse signals for Ta13, Tb13 and Tc13 are respectively opposite to those of the PWM pulse signals for Ta11, Tb11, and Tc11.

The second three-phase modulated wave signals u'$_a$, u'$_b$, and u'$_c$ respectively compare with the opposite-phase signals of the above carrier signals to generate PWM pulse signals for the bridge arm switches of respective phases Ta12, Tb12 and Tc12. The Phases of the PWM pulse signals for Ta14, Tb14 and Tc14 are respectively opposite to those of the PWM pulse signals for Ta12, Tb12 and Tc12.

Similarly, for Nth power unit of each phase, the second three-phase modulated wave signals u'$_a$, u'$_b$, and u'$_c$ generated by injecting the sectional triple harmonic signals respectively compare with carrier signals phase-shifted by 180°/N, to generate the PWM pulse signals for the bridge arm switches TaN1, TbN1 and TcN1. The phases of the PWM pulse signals for TaN3, TbN3, and TcN3 are respectively opposite to those of the PWM pulse signals for TaN1, TbN1, and TcN1.

The second three-phase modulated wave signals u'$_a$, u'$_b$, and u'$_c$, respectively compare with the opposite-phase signals of the above carrier signals phase-shifted by 180°/N, to generate the PWM pulse signals for the bridge arm switches TaN2, TbN2, and TcN2. The phases of the PWM pulse signals for TaN4, TbN4 and TcN4 are respectively opposite to those of the PWM pulse signals for TaN2, TbN2 and TcN2.

Figure 4B:
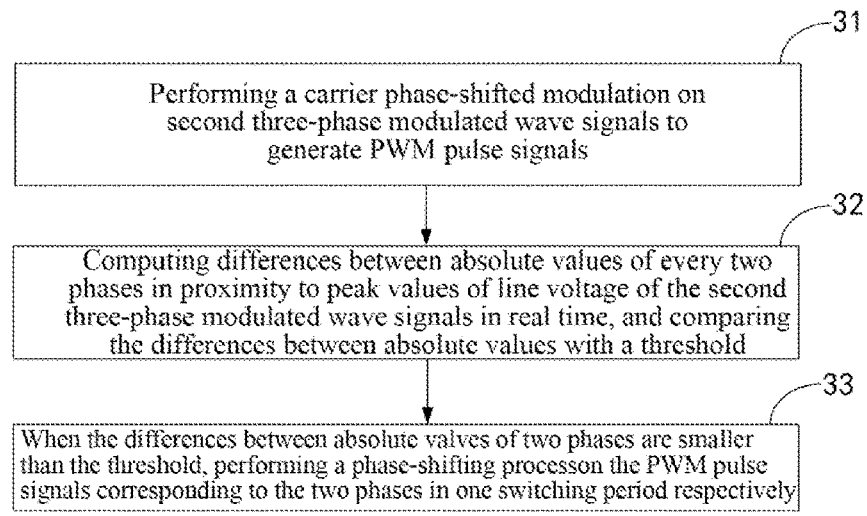
FIG. 4B is a step-by-step flowchart of step 3 in FIG. 4A.

As to the modulation method according to the present invention, please further refer to FIG. 4B, which is a step-by-step flowchart of step 3 in FIG. 4A. The above step 3 comprises:

step 31: performing a carrier phase-shifted modulation on the second three-phase modulated wave signals to generate the PWM pulse signals;

step 32: computing differences between absolute values of every two phases in proximity to the peak values of the line voltage of the second three-phase modulated wave signals in real time, and comparing the differences between absolute values with a threshold; and step 33: when the differences between absolute valves of two phases are smaller than the threshold, performing a phase-shifting process on the PWM pulse signals corresponding to the two phases in one switching period respectively. Within the switching period, the PWM pulse signals corresponding to one of the two phases and the PWM pulse signals corresponding to the other phase are phase-shifted by the opposite directions and the same time.

For some special points, such as the boundary points π/2, 5π/6, 3π/2, 11π/6, in the peak value intervals in FIG. 5, the absolute values of two phases will be approximately equal to each other in the second three-phase modulated wave signals. For example, the absolute value of $u'_b$ at π/2 is approximately equal to the absolute value of $u'_c$ in FIG. 5. Therefore, it is necessary to perform a phase-shifting process on the PWM pulse signals corresponding to those points within one switching period (a period of the corresponding carrier signal) to avoid a two-level jumping generated at those points.

Figure 7A:
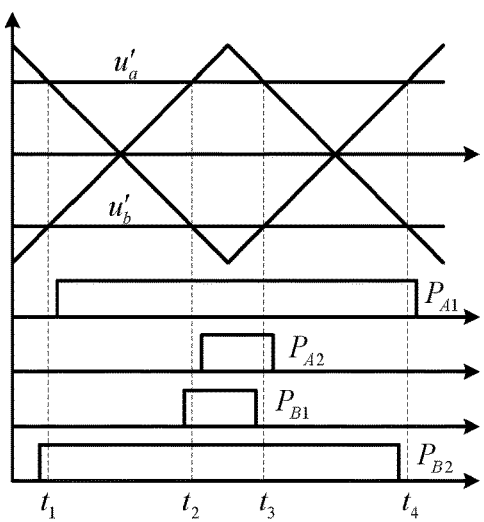
FIG. 7A is a schematic diagram showing the phase shifting of the PWM pulse signals corresponding to a power unit of A-phase and a power unit of B-phase respectively.

FIG. 7A is a schematic diagram showing the phase shifting of the PWM pulse signals corresponding to a power unit of A-phase and a power unit of B-phase respectively. The modulated wave signals of the present invention are power frequency signals at 50 HZ. The frequency of the triangular carrier signals is 600 HZ. $u'_a$ and $u'_b$ can be approximate to straight lines within a period of the carrier signals. As shown in FIG. 7A, the absolute values of the second three-phase modulated wave signals $u'_a$ and $u'_b$ are approximately identical within the same carrier period. That is, the difference between the absolute values of the two phases A and B is smaller than a given threshold. A phase-shifting process may be performed on the PWM pulse signals $P_{A1}$ and $P_{A2}$ which corresponds to the power unit of A-phase. And the PWM pulse signals $P_{A1}$ and $P_{A2}$ are generated by comparing the modulated signal $u'_a$ with the triangular carrier signal and the opposite-phase signal of the triangular carrier. And a phase-shifting process may also be performed on the PWM pulse signals $P_{B1}$ and $P_{B2}$ which corresponds to the power unit of B-phase. And the PWM pulse signals $P_{B1}$ and $P_{B2}$ are generated by comparing the modulated signal $u'_b$ with the triangular carrier signal and the opposite-phase signal of the triangular carrier signal. Here, the threshold can be set as required. The phase-shifting process for the PWM pulse signals can be implemented in several ways. For example, the amplitude of the modulated signals corresponding to a certain time can be adjusted when a carrier phase-shifted modulation is performed to implement the phase-shifting of the PWM pulse signals. As shown in FIG. 7A, the PWM pulse signals generated from the modulated wave signal $u'_a$ are shifted to right by $T_d$, and the PWM pulse signals generated from the modulated wave signal $u'_b$ are shifted to left by $T_d$. The specific implementation method is as follows:

subtracting a shifted amount $u_d$ from the modulated wave signal $u'_a$ at time $t_1$, and adding the shifted amount $u_d$ to the modulated wave signal $u'_a$ at time $t_4$, so as to shift the pulse signal $P_{A1}$ to right in a shifting time of Td;

adding the shifted amount $u_d$ to the modulated wave signal $u'_a$ at time $t_2$, and subtracting the shifted amount $u_d$ from the modulated wave signal $u'_a$ at time $t_3$, so as to shift the pulse signal $P_{A2}$ to right in the shifting time of $T_d$;

subtracting the shifted amount $u_d$ from the modulated wave signal $u'_b$ at time $t_1$, and adding the shifted amount $u_d$ to the modulated wave signal $u'_b$ at time $t_4$, so as to shift the pulse signal $P_{B1}$ to left in the shifting time of $T_d$; and adding the shifted amount $u_d$ to the modulated wave signal $u'_b$ at time $t_2$, and subtracting the shifted amount $u_d$ from the modulated wave signal $u'_b$ at time $t_3$, so as to shift the pulse signal $P_{B2}$ to left in a shifting time of $T_d$. Finally, a phase-shifting process is performed on the PWM pulse signals corresponding to A-phase and B-phase within a switching period. Further, within the switching period, the PWM pulse signals $P_{A1}$ and $P_{A2}$ corresponding to A-phase and the PWM pulse signals $P_{B1}$ and $P_{B2}$ corresponding to B-phase are phase-shifted by the opposite directions and the same time.

It should be understood that there are many ways to implement the phase-shifting of the PWM pulse signals. The present invention only illustrates one of them. The present invention mainly takes A-phase and B-phase for example. The other phases may be implemented similarly based on the above principle, and thus will not be described in detail here.

Control signals for respective power units in the three-phase multilevel converter may be generated based on the phase-shifted PWM pulse signals.

Figure 7B:
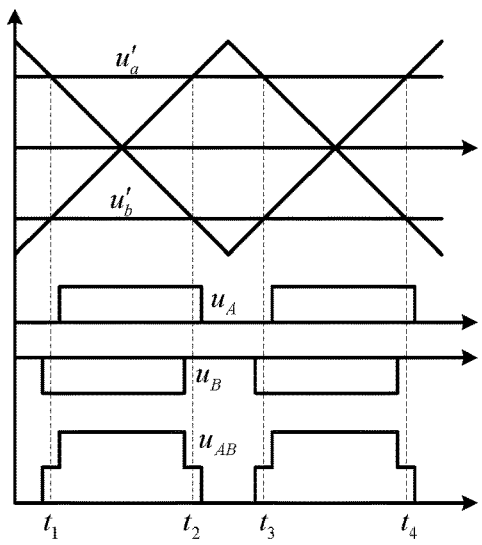
FIG. 7B shows a phase voltage and a line voltage outputted from one of the power units of A-phase and B-phase in one carrier period.

FIG. 7B shows the phase voltages and the line voltages outputted from one power unit of A-phase and one power unit of B-phase in one carrier period. As shown in FIG. 7B, with the control signals, the power unit of A-phase outputs the phase voltage $u_A$, and the power unit of B-phase outputs the phase voltage $u_B$. And the line voltage $u_{AB}$ between A-phase and B-phase is obtained finally. In FIG. 7B, the absolute values of $u'_a$ and $u'_b$ are approximately identical within the carrier period. After a phase-shifting process, the switches of A-phase and the switches of B-phase will not be turned on at the same time. And the turn-on moment will be staggered with a time of $2T_d$. Thus, the finally-obtained line voltage $u_{AB}$ will not generate the two-level jumping.

Figure 8:
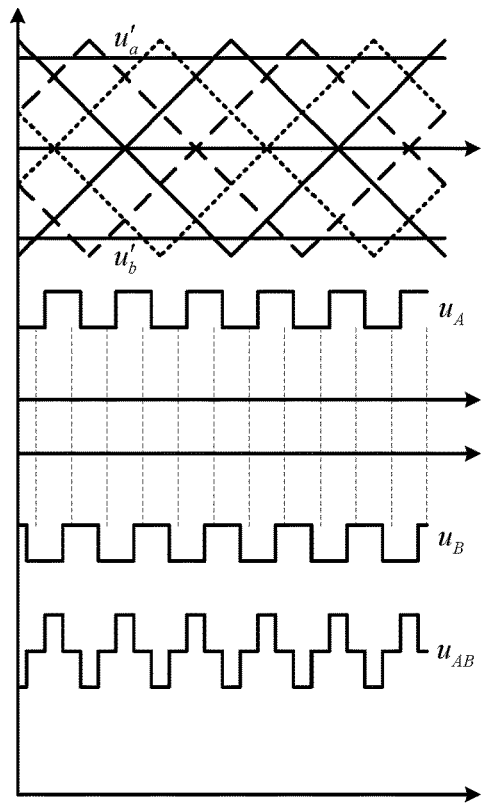
FIG. 8 shows a phase voltage and a line voltage of A-phase and B-phase outputted from a converter in one carrier period.
Figure 11:
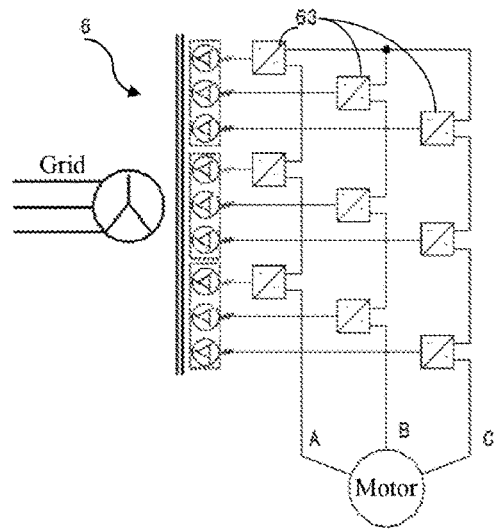
FIG. 11 is a view showing a topological structure of a three-phase H-bridge multilevel converter in the prior art.
Figure 12A:
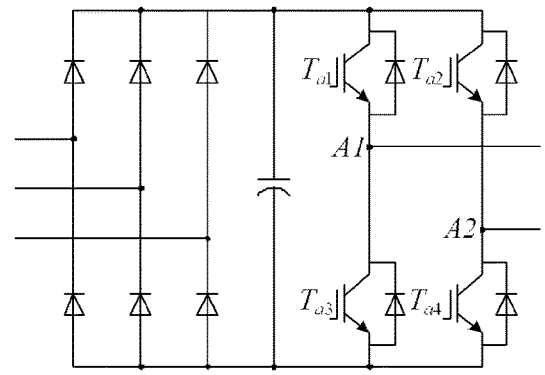
FIG. 12A is a topological structure of a power unit of A-phase in FIG. 11.
Figure 12B:
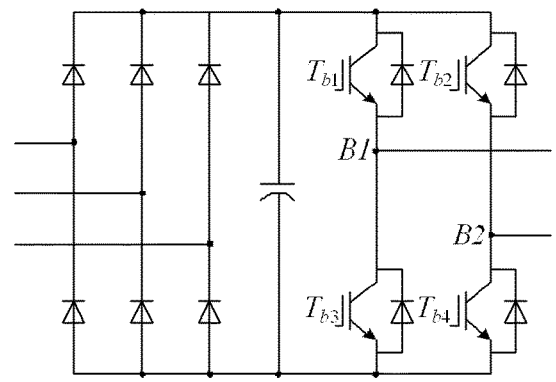
FIG. 12B is a topological structure of a power unit of B-phase in FIG. 11.
Figure 12C:
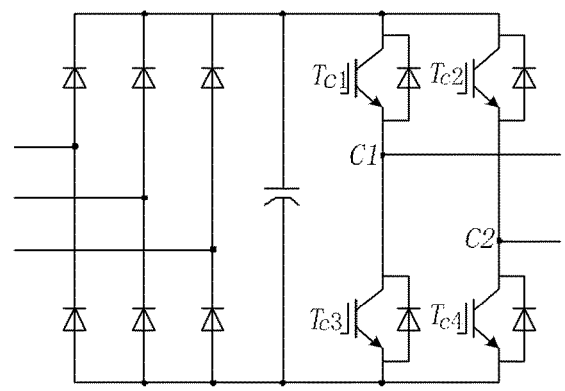
FIG. 12C is a topological structure of a power unit of C-phase in FIG. 11.

FIG. 8 shows the phase voltages and the line voltages outputted from all power units of A-phase and all power units of B-phase in the converter within one carrier period. Referring to FIG. 8 and FIG. 11, each phase of the three-phase H-bridge cascaded converter 6 comprises three cascaded power units. Thus, the phase-shifted angle among the triangular carriers for the power units of each phase is 60° (i.e., 180°/N). FIG. 8 takes A-phase and B-phase for example. The second three-phase modulated wave signals $u'_a$ and $u'_b$ are respectively compared with the triangular carriers to generate the PWM pulse signals. A phase-shifting process is performed on the PWM pulse signals. The control signals for power units of the three-phase multilevel converter are generated based on the phase-shifted PWM pulse signals. With the control signals, the power units of A-phase output the phase voltage $u_A$, and the power units of B-phase output the phase voltage $u_B$. Finally, the line voltage $u_{AB}$ between A-phase and B-phase is obtained.

Figure 1:
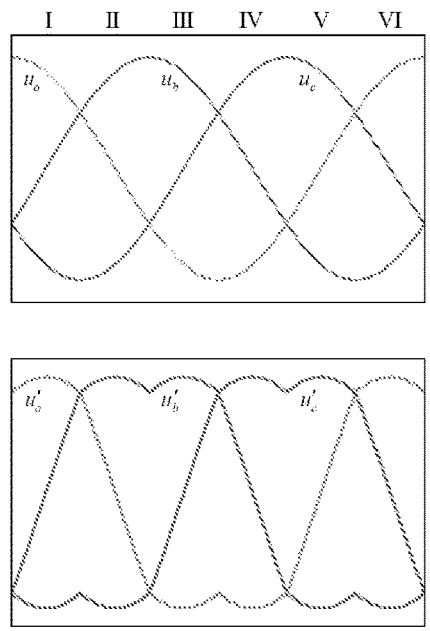
FIG. 1 is a schematic diagram showing three-phase sinusoidal modulated waves $u_a$, $u_b$, $u_c$, and conventional saddle-shaped modulated waves $u'_a$, $u'_b$, $u'_c$ injected with a triple harmonic.
Figure 2:
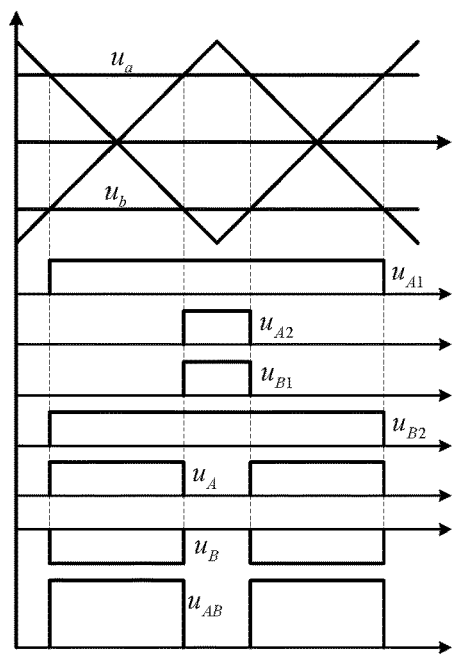
FIG. 2 is a schematic diagram showing a case in which a unipolar frequency-doubled modulation is used.
Figure 3:
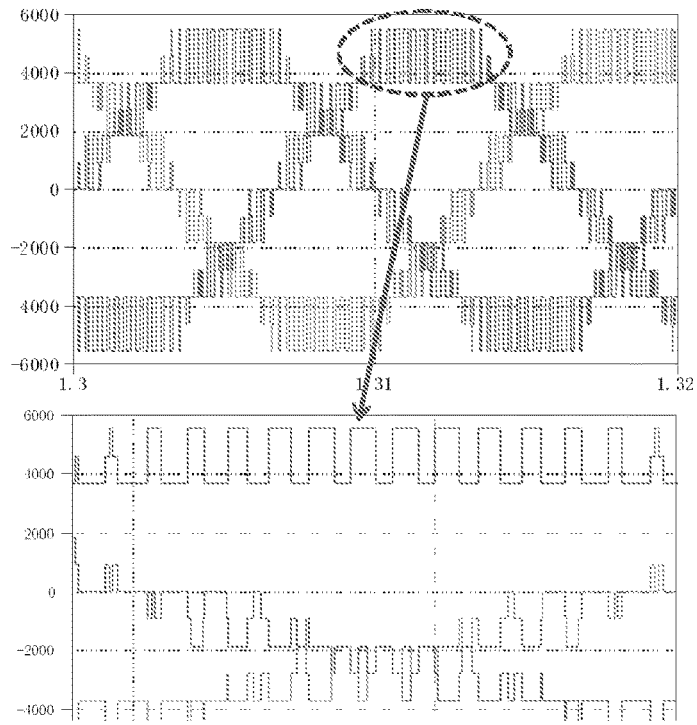
FIG. 3 is a schematic diagram showing outputted line voltages of A-phase and B-phase when the conventional saddle-shaped modulated waves plus unipolar doubled-frequency carrier phase-shifted modulation are used, and its local enlarged view.
Figure 9:
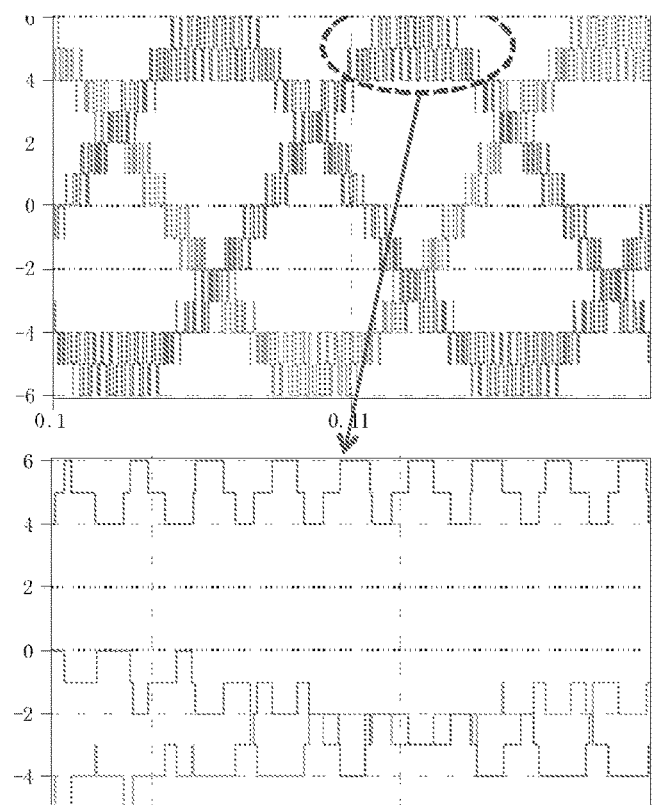
FIG. 9 is a schematic diagram showing a waveform of the line voltage outputted from the three-phase multilevel converter according to the modulation method of the present invention, and its local enlarged view.

Referring to FIG. 3 and FIG. 9, FIG. 9 is a schematic diagram showing a waveform of the line voltage outputted from the three-phase multilevel converter according to the modulation method of the present invention, and its local enlarged view. As shown in FIG. 9, no two-level jumping occurs within a power frequency cycle in the waveform $u_{AB}$, including the region in proximity to the peak values of the line voltage. Compared with the conventional modulation method, the modulation method according to the present invention prevents the two-level voltage jumping from occurring in proximity to the peak value of the line voltage outputted from the system. When the system is connected to a motor via a long cable, the modulation method according to the present invention may reduce the overvoltage caused by the distribution parameters at the motor end, which protects the motor from the insulation and prolongs the service life of the motor.

Figure 10:
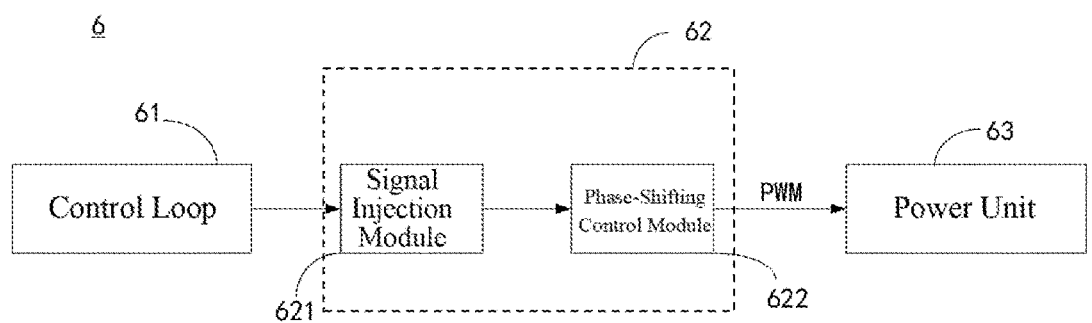
FIG. 10 is a conceptual view of the three-phase multilevel converter according to the present invention.

FIG. 10 is a schematic view of the three-phase multilevel converter according to the present invention. As shown in FIG. 10, the three-phase multilevel converter 6 comprises a control loop 61, a modulator 62 and a plurality of power units 63. The control loop 61 generates the first three-phase sinusoidal modulated wave signals. The modulator 62 is electrically coupled with the control loop 61 and the power units 63. The modulator 62 injects triple harmonic signals into the first three-phase sinusoidal modulated wave signals to generate the second three-phase modulated wave signals. The modulator 62 generates the PWM pulse signals based on the second three-phase modulated wave signals. And the modulator 62 generates the control signals based on the PWM pulse signals. The control signals are transmitted to the power units 63 to control the switches of respective bridge arms. Here, by injecting the triple harmonic signal, in proximity to the peak values of the line voltage of the second three-phase modulated wave signals, the absolute values of any two phases are unequal. And the maximum voltage utilization is maintained.

Furthermore, the modulator comprises a signal injection module 621 which injects the triple harmonic signals into the first three-phase sinusoidal modulated wave signals and outputs the second three-phase modulated wave signals. The triple harmonic signals injected are sectional. The expressions of the sectional triple harmonic signals may be the expressions described in the above first or second embodiments, but the present invention is not limited thereto. In other embodiments, the triple harmonic signals injected can be adjusted according to the design requirements. By injecting triple harmonic signals, the absolute values of any two phases in proximity to the peak values of the line voltage of the generated second three-phase modulated wave signals are unequal. The above obtained triple harmonic signals $u_z$ is injected into the first three-phase sinusoidal modulated wave signals $u_a$, $u_b$ and $u_c$ according to the divided modulated intervals. The second three-phase modulated wave signals obtained are expressed as follows:

$$u'_a = u_a + u_z,$$

$$u'_b = u_b + u_z,$$

$$u'_c = u_c + u_z.$$

In proximity to the peak values of the line voltage of the second three-phase modulated wave signals in the above expressions, the absolute values of any two phases are unequal. And the maximum voltage utilization is maintained. So the two-level jumping is prevented from occurring in the line voltage outputted from the bridge arm in the three-phase multilevel cascaded converter. Thereby, the overvoltage at the motor end is reduced, the motor is protected from the insulation and the service life of the motor is prolonged. In the above embodiment, "in proximity to peak values" indicates the intervals in which the absolute values of the amplitudes of the second three-phase modulated wave signals reach their maximum values. When taking $u'_b$ in FIG. 5 for example, the intervals "in proximity to peak values" are ($\pi/2$, $5\pi/6$) and ($3\pi/2$, $11\pi/6$); and when taking $u'_b$ in FIG. 6 for example, the internals "in proximity to peak values" are ($\pi/3$, $\pi/2$), ($5\pi/6$, $\pi$), ($4\pi/3$, $3\pi/2$), and ($11\pi/6$, $2\pi$).

A phase-shifting control module 622 is electrically coupled with the signal injection module 621, for receiving the second three-phase modulated wave signals and performing a phase-shifting control on the second three-phase modulated wave signals to generate the PWM pulse signals. The phase-shifting control module 622 generates the control signals for respective power units in the three-phase multilevel converter according to the PWM pulse signals. Here, the detailed operations of the phase-shifting control module 622 may refer to the above modulation method, and thus will not be described in detailed here. It should be understood that the phase-shifting control comprises the carrier phase-shifted modulation and the phase-shifting control for the PWM pulse signals at certain points.

Furthermore, the phase-shifting control module 622 computes the differences between absolute values of every two phases in proximity to the peak values of the line voltage of the second three-phase modulated wave signals in real time, and compares the differences with a threshold. When the differences between absolute valves of two phases are smaller than the threshold, the phase-shifting process is performed on the PWM pulse signals corresponding to the two phases in one switching period respectively. Within the switching period, the PWM pulse signals corresponding to one of the two phases and the PWM pulse signals corresponding to the other phase are phase-shifted by the opposite directions and the same time. Here, the phase-shifting process of the phase-shifting control module 622 may refer to the above modulation method and thus will not be described in detailed here. It should be understood that there are many ways to implement the phase-shifting process for the PWM pulse signals. The present invention only illustrates one of them.

Figure 13A:
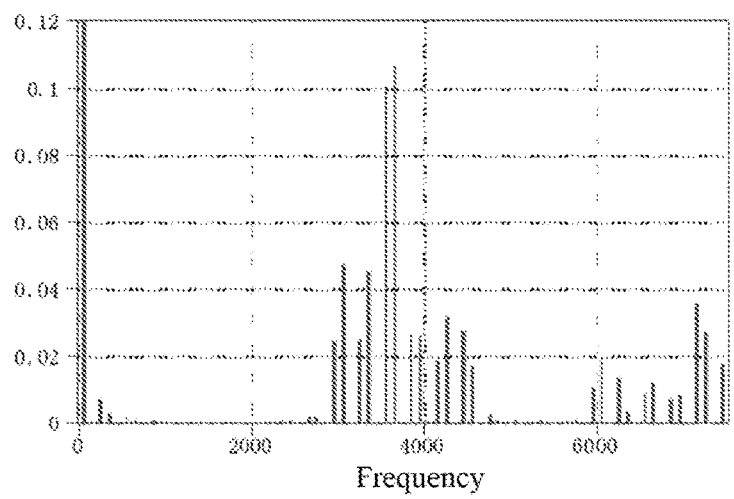
FIG. 13A is a schematic diagram of Fast Fourier Transform (FFT) for a line voltage outputted from a three-level cascaded converter when a conventional saddle-shaped modulated waves plus unipolar doubled-frequency carrier phase-shifted modulation is used.
Figure 13B:
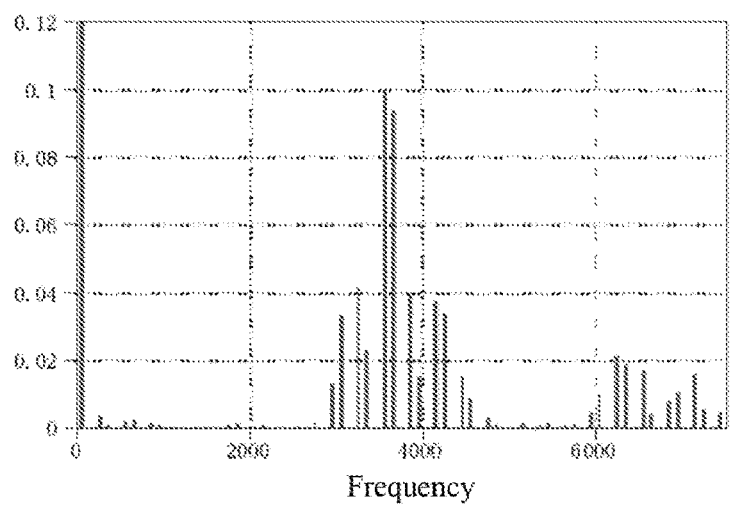
FIG. 13B is a schematic diagram of a schematic diagram of FFT for the line voltage outputted from the three-level cascaded converter when the modulation method according to the present invention is applied.

Referring to FIGS. 13A and 13B, FIG. 13A is a schematic diagram of Fast Fourier Transform (FFT) for the line voltage outputted from the three-level cascaded converter when a conventional saddle-shaped modulated waves with unipolar doubled-frequency carrier phase-shifted modulation is used; and FIG. 13B is a schematic diagram of FFT for the line voltage outputted from the three-level cascaded converter when the modulation method according to the present invention is applied. The Fourier analysis curves showing in FIG. 13A and FIG. 13B are identical. That is, the harmonic distribution of the line voltage outputted from the system by applying the modulation method according to the present invention is identical to the harmonic distribution of the line voltage outputted from the system by applying the conventional saddle-shaped modulated waves with unipolar doubled-frequency carrier phase-shifted modulation. Therefore, the solution of the present invention can eliminate the two-level jumping in proximity to the peak values of the line voltage without influencing the harmonic distribution of the line voltage disadvantageously.

To sum up, the present invention may inhibit the two-level jumping in the line voltage outputted from the bridge arms of the three-phase multilevel inverter. Thereby the overvoltage at the motor end is reduced, the motor is protected from the insulation, and the service lift of the motor is prolonged.

It should be understood that the above embodiments are only provided for illustration of the present invention, rather than limiting technical solution of the present invention. Meanwhile, although the present invention is described in detail with reference to the above embodiments in the specification, those skilled in the art should understand that the present invention may be modified or equivalent replaced. Therefore, all technical solutions and improvements without departing from the spirit and scope of the present invention can be incorporated in the protection scope of the appended claims of the present invention.

What is claimed is:
1. A modulation method for a three-phase multilevel converter, comprising the following steps:

step 1: generating first three-phase sinusoidal modulated wave signals by a control loop in the three-phase multilevel converter;

step 2: generating second three-phase modulated wave signals by processing the first three-phase sinusoidal modulated wave signals, wherein in proximity to peak values of a line voltage of the second three-phase modulated wave signals, absolute values of any two phases are unequal;

step 3: generating PWM pulse signals based on the second three-phase modulated wave signals; and step 4: generating driving signals for respective power units in the three-phase multilevel converter based on the PWM pulse signals.

2. The modulation method according to claim 1, wherein the step 2 further comprises:

injecting triple harmonic signals into the first three-phase sinusoidal modulated wave signals to generate the second three-phase modulated wave signals.

3. The modulation method according to claim 1, wherein the step 3 further comprises:

step 31: performing a carrier phase-shifted modulation on the second three-phase modulated wave signals to generate the PWM pulse signals; and step 32: computing differences between absolute values of every two phases in proximity to the peak values of the line voltage of the second three-phase modulated wave signals in real time, and comparing the differences between absolute values with a threshold.

4. The modulation method according to claim 3, wherein the step 3 further comprises:

step 33: when the differences between absolute valves of two phases are smaller than the threshold, performing a phase-shifting process on the PWM pulse signals corresponding to the two phases in one switching period respectively.

5. The modulation method according to claim 4, wherein within the switching period, the PWM pulse signals corresponding to one of the two phases and the PWM pulse signals corresponding to the other phase are phase-shifted by opposite directions and the same time.

6. The modulation method according to claim 2, wherein triangular carriers of the three-phase multilevel converter change within a range of −Um to Um, and expressions of the triple harmonic signals are as follows:

$$\text{when } 0 \leq \theta < \frac{\pi}{6}, u_z = \frac{\sqrt{3}}{2}U_m - u_a;$$

$$\text{when } \frac{\pi}{6} \leq \theta < \frac{\pi}{2}, u_z = -\frac{\sqrt{3}}{2}U_m - u_c;$$

$$\text{when } \frac{\pi}{2} \leq \theta < \frac{5\pi}{6}, u_z = \frac{\sqrt{3}}{2}U_m - u_b;$$

$$\text{when } \frac{5\pi}{6} \leq \theta < \frac{7\pi}{6}, u_z = -\frac{\sqrt{3}}{2}U_m - u_a;$$

$$\text{when } \frac{7\pi}{6} \leq \theta < \frac{3\pi}{2}, u_z = \frac{\sqrt{3}}{2}U_m - u_c;$$

$$\text{when } \frac{3\pi}{2} \leq \theta < \frac{11\pi}{6}, u_z = -\frac{\sqrt{3}}{2}U_m - u_b; \text{ and}$$

$$\text{when } \frac{11\pi}{6} \leq \theta < 2\pi, u_z = \frac{\sqrt{3}}{2}U_m - u_a,$$

where $u_z$ is the triple harmonic signal, $u_a$, $u_b$, and $u_c$ are the first sinusoidal modulated wave signals of A-phase, B-phase and C-phase in the three-phase multilevel converter, and θ is the phase angle of the first sinusoidal modulated wave signal $u_a$.

7. The modulation method according to claim 2, wherein triangular carriers of the three-phase multilevel converter change within a range of −Um to Um, and expressions of the triple harmonic signals are as follows:

$$\text{when } 0 \leq \theta < \frac{\pi}{6}, u_z = -\frac{\sqrt{3}}{2}U_m - u_c;$$

$$\text{when } \frac{\pi}{6} \leq \theta < \frac{\pi}{3}, u_z = \frac{\sqrt{3}}{2}U_m - u_a;$$

$$\text{when } \frac{\pi}{3} \leq \theta < \frac{\pi}{2}, u_z = \frac{\sqrt{3}}{2}U_m - u_b;$$

$$\text{when } \frac{\pi}{2} \leq \theta < \frac{2\pi}{3}, u_z = -\frac{\sqrt{3}}{2}U_m - u_c;$$

$$\text{when } \frac{2\pi}{3} \leq \theta < \frac{5\pi}{6}, u_z = -\frac{\sqrt{3}}{2}U_m - u_a;$$

$$\text{when } \frac{5\pi}{6} \leq \theta < \pi, u_z = \frac{\sqrt{3}}{2}U_m - u_b;$$

$$\text{when } \pi \leq \theta < \frac{7\pi}{6}, u_z = \frac{\sqrt{3}}{2}U_m - u_c;$$

$$\text{when } \frac{7\pi}{6} \leq \theta < \frac{4\pi}{3}, u_z = -\frac{\sqrt{3}}{2}U_m - u_a;$$

$$\text{when } \frac{4\pi}{3} \leq \theta < \frac{3\pi}{2}, u_z = -\frac{\sqrt{3}}{2}U_m - u_b;$$

$$\text{when } \frac{3\pi}{2} \leq \theta < \frac{5\pi}{3}, u_z = \frac{\sqrt{3}}{2}U_m - u_c;$$

$$\text{when } \frac{5\pi}{3} \leq \theta < \frac{11\pi}{6}, u_z = \frac{\sqrt{3}}{2}U_m - u_a; \text{ and}$$

$$\text{when } \frac{11\pi}{6} \leq \theta < 2\pi, u_z = -\frac{\sqrt{3}}{2}U_m - u_b,$$

where $u_z$ is the triple harmonic signal, $u_a$, $u_b$, and $u_c$ are the first sinusoidal modulated wave signals of A-phase, B-phase and C-phase in the three-phase multilevel converter, and θ is the phase angle of the first sinusoidal modulated wave signal $u_a$.

8. A three-phase multilevel converter, comprising:

a control loop for generating first three-phase sinusoidal modulated wave signals;

a plurality of power units;

a modulator which is electrically coupled with the control loop and the power units, wherein the modulator processes first three-phase sinusoidal modulated wave signals to generate second three-phase modulated wave signals, generates PWM pulse signals based on the second three-phase modulated wave signals, and transmits the PWM pulse signals to the plurality of power units, and the power plurality of units generate driving signals based on the PWM pulse signals, wherein in proximity to peak values of a line voltage of the second three-phase modulated wave signals, absolute values of any two phases are unequal.

9. The three-phase multilevel converter according to claim 8, wherein the second three-phase modulated wave signals are generating by injecting triple harmonic signals into the first three-phase sinusoidal modulated wave signals.

10. The three-phase multilevel converter according to claim 9, wherein the modulator comprises:

a signal injection module for injecting the triple harmonic signals into the first three-phase sinusoidal modulated wave signals and outputting the second three-phase modulated wave signals; and a phase-shifting control module which is electrically coupled with the signal injection module, for receiving the second three-phase modulated wave signals and performing a carrier phase-shifted process on the second three-phase modulated wave signals to generate the PWM pulse signals, computing differences between absolute values of every two phases in proximity to the peak values of the line voltage of the second three-phase modulated wave signals in real time, and comparing the differences between absolute values with a threshold.

11. The three-phase multilevel converter according to claim 10, wherein when the differences between absolute valves of two phases are smaller than the threshold, the phase-shifting control module performs a phase-shifting process on the PWM pulse signals corresponding to the two phases in one switching period respectively.

12. The three-phase multilevel converter according to claim 11, wherein within the switching period, the PWM pulse signals corresponding to one of the two phases and the PWM pulse signals corresponding to the other phase are phase-shifted by opposite directions and the same time.

13. The three-phase multilevel converter according to claim 9, wherein triangular carriers of the three-phase multilevel converter change within a range of −Um to Um, and expressions of the triple harmonic signals are as follows:

$$\text{when } 0 \le \theta < \frac{\pi}{6}, u_z = \frac{\sqrt{3}}{2}U_m - u_a;$$

$$\text{when } \frac{\pi}{6} \le \theta < \frac{\pi}{2}, u_z = -\frac{\sqrt{3}}{2}U_m - u_c;$$

$$\text{when } \frac{\pi}{2} \le \theta < \frac{5\pi}{6}, u_z = \frac{\sqrt{3}}{2}U_m - u_b;$$

$$\text{when } \frac{5\pi}{6} \le \theta < \frac{7\pi}{6}, u_z = -\frac{\sqrt{3}}{2}U_m - u_a;$$

$$\text{when } \frac{7\pi}{6} \le \theta < \frac{3\pi}{2}, u_z = \frac{\sqrt{3}}{2}U_m - u_c;$$

$$\text{when } \frac{3\pi}{2} \le \theta < \frac{11\pi}{6}, u_z = -\frac{\sqrt{3}}{2}U_m - u_b; \text{ and}$$

$$\text{when } \frac{11\pi}{6} \le \theta < 2\pi, u_z = \frac{\sqrt{3}}{2}U_m - u_a;$$

where $u_z$ is the triple harmonic signal, $u_a$, $u_b$, and $u_c$ are the sinusoidal modulated wave signals of A-phase, B-phase and C-phase in the three-phase multilevel converter, and $\theta$ is the phase angle of the first sinusoidal modulated wave signal $u_a$.

14. The three-phase multilevel converter according to claim 9, wherein triangular carriers of the three-phase multilevel converter change within a range of −Um to Um, and expressions of the triple harmonic signals are as follows:

$$\text{when } 0 \le \theta < \frac{\pi}{6}, u_z = -\frac{\sqrt{3}}{2}U_m - u_c;$$

$$\text{when } \frac{\pi}{6} \le \theta < \frac{\pi}{3}, u_z = \frac{\sqrt{3}}{2}U_m - u_a;$$

$$\text{when } \frac{\pi}{3} \le \theta < \frac{\pi}{2}, u_z = \frac{\sqrt{3}}{2}U_m - u_b;$$

$$\text{when } \frac{\pi}{2} \le \theta < \frac{2\pi}{3}, u_z = -\frac{\sqrt{3}}{2}U_m - u_c;$$

$$\text{when } \frac{2\pi}{3} \le \theta < \frac{5\pi}{6}, u_z = -\frac{\sqrt{3}}{2}U_m - u_a;$$

$$\text{when } \frac{5\pi}{6} \le \theta < \pi, u_z = \frac{\sqrt{3}}{2}U_m - u_b;$$

$$\text{when } \pi \le \theta < \frac{7\pi}{6}, u_z = \frac{\sqrt{3}}{2}U_m - u_c;$$

$$\text{when } \frac{7\pi}{6} \le \theta < \frac{4\pi}{3}, u_z = -\frac{\sqrt{3}}{2}U_m - u_a;$$

$$\text{when } \frac{4\pi}{3} \le \theta < \frac{3\pi}{2}, u_z = -\frac{\sqrt{3}}{2}U_m - u_b;$$

$$\text{when } \frac{3\pi}{2} \le \theta < \frac{5\pi}{3}, u_z = \frac{\sqrt{3}}{2}U_m - u_c;$$

$$\text{when } \frac{5\pi}{3} \le \theta < \frac{11\pi}{6}, u_z = \frac{\sqrt{3}}{2}U_m - u_a; \text{ and}$$

$$\text{when } \frac{11\pi}{6} \le \theta < 2\pi, u_z = -\frac{\sqrt{3}}{2}U_m - u_b;$$

where $u_z$ is the triple harmonic signal, $u_a$, $u_b$, and $u_c$ are the sinusoidal modulated wave signals of A-phase, B-phase and C-phase in the three-phase multilevel converter, and $\theta$ is the phase angle of the first sinusoidal modulated wave signal $u_a$.

* * * * *